(12) United States Patent
Bandera et al.

(10) Patent No.: US 6,573,310 B2
(45) Date of Patent: Jun. 3, 2003

(54) PROCESS FOR THE PRODUCTION OF EXPANDED POLYPROPYLENE AND END-PRODUCTS BASED ON EXPANDED POLYPROPYLENE

(75) Inventors: Franco Bandera, Busto Arsizio (IT); Enrico Venegoni, Busto Arsizio (IT)

(73) Assignee: Construzioni Meccaniche Luigi Bandera S.p.A., Busto Arsizio (IT)

( * ) Notice: Subject to any disclaimer, the term of this patent is extended or adjusted under 35 U.S.C. 154(b) by 0 days.

(21) Appl. No.: 09/996,670

(22) Filed: Nov. 29, 2001

(65) Prior Publication Data

US 2002/0068769 A1 Jun. 6, 2002

(30) Foreign Application Priority Data

Dec. 4, 2000 (IT) ...................................... MI2000A2614

(51) Int. Cl.$^7$ .................................................. C08J 9/00
(52) U.S. Cl. ....................................... 521/142; 521/134
(58) Field of Search ................................ 521/142, 134, 521/79, 81

(56) References Cited

U.S. PATENT DOCUMENTS 5,817,705 A * 10/1998 Wilkes et al.
5,993,706 A * 11/1999 Wilkes et al.
6,277,896 B1 * 8/2001 Roth et al.

FOREIGN PATENT DOCUMENTS

| EP | 0 570 221 | 11/1993 |
| WO | WO 93 15132 A | 8/1993 |

* cited by examiner

Primary Examiner—Morton Foelak
(74) Attorney, Agent, or Firm—Hedman & Costigan, P.C.

(57) ABSTRACT

The present invention relates to a process comprising the following phases: the feeding and melting of polypropylene to obtain a molten polymer; addition to the molten polymer of possible additives; mixing of the molten polymer with the additives; introduction of the expanding agent $CO_2$ into the molten polymer; extrusion of the molten polymer, expanding agent and possible additives to produce an expanded polypropylene, wherein the polypropylene fed and melted in the first phase consists of a polypropylene which contains a quantity ranging from 15 to 25% of high melt strength polypropylene and wherein the temperature is lowered to a value of about 160° C. immediately after introducing the $CO_2$ gas into the molten polymer.

14 Claims, 1 Drawing Sheet

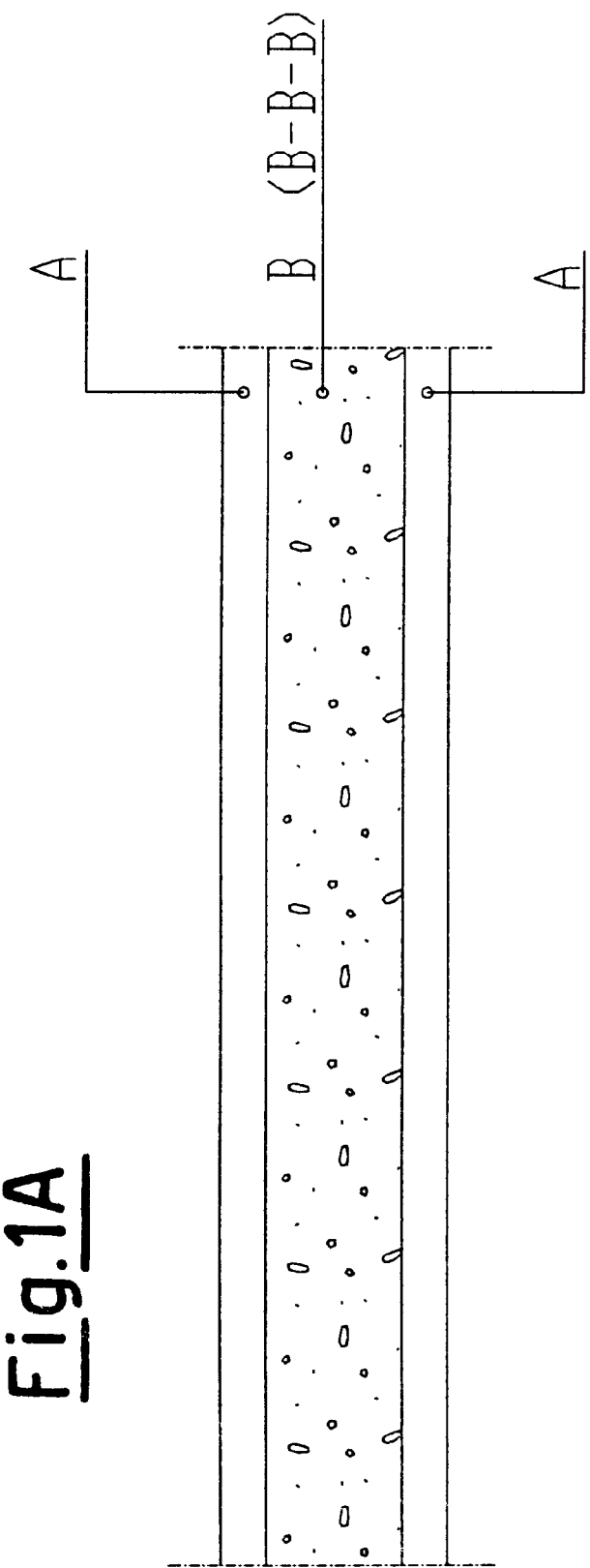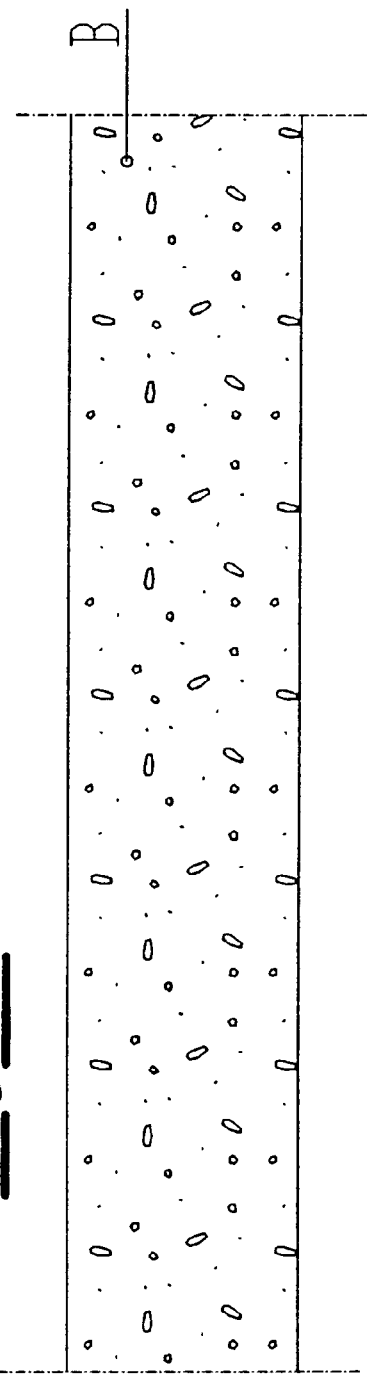
Fig.1A
Fig.1B

PROCESS FOR THE PRODUCTION OF EXPANDED POLYPROPYLENE AND END-PRODUCTS BASED ON EXPANDED POLYPROPYLENE

The present application claims priority to Italian Patent Application No. MI 2000A 002614, filed Dec. 4, 2000.

BACKGROUND OF THE INVENTION

The present invention relates to a process for the production of expanded polypropylene and end-products based on expanded polypropylene.

Whereas polymers such as polyethylene or polystyrene do not have any particular problems when subjected to an expansion process by the use of chemical or physical agents, polypropylene is a polymer having various characteristics which do not allow easy expansion. It is, in fact, characterized, in the molten state and at its typical rheological temperature, by a fluidity which is such that the action of gases used for expanding the cells, causes the polypropylene structure to collapse.

The production of expanded polypropylene end-products, on the other hand, is particularly interesting due to the low cost of polypropylene and to its good mechanical and thermal resistance.

Processes are known for the production of expanded polypropylene which, by means of an extrusion process, chemically expand this polymer with the use of chemical expanding agents, obtaining expanded products with specific weights higher than 0.6 kg/dm$^3$.

Furthermore, chemical expanding agents, used with percentages equal to 2–6% with respect to the polypropylene, are very expensive. There are also methods in which the expansion is obtained by the use of physical agents such as $CO_2$, which are injected into the molten polymer.

SUMMARY OF THE INVENTION

The objective of the present invention is therefore to produce expanded polypropylene end-products which can be used in various fields such as, for example, the car industry (internal door linings), for food packaging, fruit containers, etc.

In particular, the objective of the present invention is to produce end-products consisting of sheets or plates, of varying dimensions, using polypropylene, whose mass is expanded with closed micro-cells by the use of $CO_2$, having a specific weight ranging from 0.5 kg/dm$^3$ to 0.3 kg/dm$^3$, preferably a specific weight equal to about 0.35 kg/dm$^3$.

This objective according to the present invention is surprisingly achieved by means of a process comprising the following phases:

(a) the feeding and melting of polypropylene to obtain a molten polymer;

(b) addition to the molten polymer of possible additives;

(c) mixing of the molten polymer with the additives;

(d) introduction of the expanding agent $CO_2$ into the molten polymer;

(e) extrusion of the molten polymer, expanding agent and possible additives to produce an expanded polypropylene;

said process being characterized in that the polypropylene fed and melted in phase a) consists of a polypropylene which contains a quantity ranging from 15 to 25% of high melt strength polypropylene and in that the temperature is lowered to a value of about 160° C. immediately after the introduction of the $CO_2$ gas into the molten polymer.

In particular, the introduction of the expanding agent $CO_2$ into the molten polymer, i.e. phase d), can be effected by injecting liquid gas under pressure into the molten mass or by the injection of expanded gas under vacuum.

The high melt strength polypropylene can be partly or completely substituted with polyethylene.

The additives can consist of mineral fillers, such as $CaCO_3$, talc or others.

A further object of the present invention relates to end-products based on expanded polypropylene obtainable with the process according to the present invention.

Another object of the present invention also relates to the use of expanded polypropylene obtainable with the process according to the present invention for the production of end-products, in particular of end-products in the car industry, such as internal door linings, and in the field of food packaging, such as fruit containers.

The main advantage of the process according to the present invention lies in the production of expanded polypropylene end-products having excellent mechanical and thermal resistance, and at the same time at a particularly low cost.

A further advantage consists in the fact that the expanded polypropylene end-products, in particular plates, obtainable by the process according to the present invention, have a smooth breakage and are therefore particularly useful in the car industry, especially for internal door linings, thanks to the safe properties of the material.

Another advantage of the process according to the present invention is linked to the use of $CO_2$. $CO_2$, in fact, can be handled without danger, it is ecologically more convenient with respect to other gases as it is a natural re-used resource, is produced without any kind of burning and at a low cost; $CO_2$ furthermore is the most suitable gas for a non-violent expansion.

BRIEF DESCRIPTION OF THE DRAWINGS

The characteristics and advantages of a process according to the present invention will appear more evident from the following illustrative and non-limiting description, referring to the enclosed drawing in which:

FIG. 1A is a sectional view of an embodiment of a multilayer sandwich co-extruded end-product A-B-A according to the present invention;

FIG. 1B is a sectional view of an embodiment of a monolayer extruded end-product (B) according to the present invention.

DETAILED DESCRIPTION OF THE INVENTION

The process for the production of expanded polypropylene end-products according to the present invention can also be fed with a recycled material consisting of ground waste cuttings of the expanded polypropylene end-product itself.

The lowering of the temperature of the molten product, immediately after injection of the gas, allows the viscosity of the molten product to be increased, thus favouring the physical phenomenon called Henry's Law (according to which the solvency of gases in solids is proportional to the pressure exerted) and further limits the collapsing of the polypropylene.

The end-products based on expanded polypropylene obtainable according to the process of the present invention can be produced as plates or sheets.

In particular, they can consist of completely expanded mono-extruded laminates in a single layer, indicated with B in FIG. 1B.

Alternatively, the end-product can consist of a co-extruded laminate in at least two layers, one of which is expanded polypropylene (B) and one of non-expanded material compatible with the expanded polypropylene (A).

Or, again with the help of other co-extruders, the end-products obtainable with the process according to the present invention can consist of sandwich co-extruded laminates A-B-A (see FIG. 1A).

The non-expanded layers A are however always produced in compatible materials.

The structure B, in addition to being expanded, can be charged with mineral fillers, such as $CaCO_3$, talc or others, which allow an increase in the rigidity of the structure, to favour expansion as nucleating agents and reduce costs.

In particular, the molten product can be sent to a stratifier, for example a traditional system manufactured by the company Cloeren (U.S.A.), which conveys the three laminar layers A-B-A, of which the layer B, expanded, comes from the process according to the present invention, whereas the layers A come from one or two conventional co-extruders. The stratifier can also be structured so as to produce an end-product B-B-B.

The end-product based on expanded polypropylene has a specific weight ranging from 0.5 $kg/dm^3$ to 0.3 $kg/dm^3$ and preferably equal to 0.35 $kg/dm^3$.

It has also been verified that the expanded plates obtained with expanded polypropylene according to the present invention, when applied as a substitute for traditional internal door linings for cars, and subjected to the crash test, have a smooth breakage, consequently increasing the safety of the material in applications of this kind.

EXAMPLE

70% of EPS MOPLEN 31 HP polypropylene is mixed with 20% of PROFAX PF 814 HMS polypropylene. The mixture of polymers is then brought to a temperature of about 170° C. and melted. 10% of a mineral filler consisting of $CaCO_3$ is then added to this molten mixture.

After further mixing of the filler in the molten polymer, about 0.015 liters per kg of polymer of liquid $CO_2$ are subsequently injected.

The temperature is lowered to a value of about 160° C. immediately after the introduction of the gas $CO_2$. The molten product is then extruded and an expanded end-product is obtained with a specific weight equal to 0.35 $kg/dm^3$.

What is claimed is:

1. A process for the production of end-products based on expanded polypropylene comprising the following phases:
    (a) the feeding and melting of polypropylene to obtain a molten polymer;
    (b) addition to the molten polymer of possible additives;
    (c) mixing of the molten polymer with the additives;
    (d) introduction of the expanding agent $CO_2$ into the molten polymer;
    (e) extrusion of the molten polymer, expanding agent and possible additives to produce an expanded polypropylene;

said process being characterized in that the polypropylene fed and melted in phase a) consists of a polypropylene which contains a quantity ranging from 15 to 25% of high melt strength polypropylene and in that the temperature is lowered to a value of about 160° C. immediately after the introduction of the gas $CO_2$ into the molten polymer.

2. The process according to claim 1, characterized in that the introduction of the expanding agent $CO_2$ into the molten polymer is effected by the injection of liquified gas under pressure into the molten mass.

3. The process according to claim 1, characterized in that the introduction of the expanding agent $CO_2$ into the molten polymer is effected by the injection of expanded gas under vacuum.

4. The process according to claim 1, characterized in that the high melt strength polypropylene is partly or completely substituted with polyethylene.

5. The process according to claim 1, characterized in that the additives are mineral fillers selected from the group consisting of $CaCO_3$ and talc.

6. The process according to claim 1, characterized in that the polymer fed and melted in phase a) also comprises recycled material consisting of ground waste cuttings of the expanded polypropylene end-product itself.

7. An end-product based on expanded polypropylene obtained by the process according to claim 1.

8. The end-product according to claim 7, characterized in that it is produced in the form of a plate or sheet.

9. The end-product according to claim 7, characterized in that it has a specific weight ranging from 0.5 $kg/dm^3$ to 0.3 $kg/dm^3$.

10. The end-product according to claim 7, characterized in that it has a specific weight equal to about 0.35 $kg/dm^3$.

11. The end-product according to claim 7, characterized in that it consists of a mono-extruded laminate in a single expanded polypropylene layer (B).

12. The end-product according to claim 7, characterized in that it consists of a co-extruded laminate in at least two layers, one consisting of expanded polypropylene (B) and one of a non-expanded material compatible with the expanded polypropylene (A).

13. The end-product according to claim 12, characterized in that it consists of a co-extruded laminate in a sandwich structure A-B-A.

14. The end-product according to claim 7, characterized in that it consists of products for the car industry and products for the food packaging field.

* * * * *